(12) United States Patent
Daggubati

(10) Patent No.: US 11,695,571 B2
(45) Date of Patent: *Jul. 4, 2023

(54) SYSTEM ENABLING DIGITAL SIGNATURE OF A DOCUMENT IN AN ONLINE MEETING

(71) Applicant: Kishore Daggubati, Danville, CA (US)

(72) Inventor: Kishore Daggubati, Danville, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/585,548

(22) Filed: Jan. 27, 2022

(65) Prior Publication Data

US 2022/0150075 A1 May 12, 2022

Related U.S. Application Data

(63) Continuation-in-part of application No. 16/991,067, filed on Aug. 12, 2020, now Pat. No. 11,451,747.

(51) Int. Cl.
| | |
|---|---|
| *H04L 9/32* | (2006.01) |
| *H04L 65/403* | (2022.01) |
| *G06F 21/62* | (2013.01) |
| *H04L 65/401* | (2022.01) |
| *H04L 12/18* | (2006.01) |
| *H04L 65/1089* | (2022.01) |
| *G06F 21/60* | (2013.01) |
| *H04N 7/14* | (2006.01) |

(Continued)

(52) U.S. Cl.
CPC .......... *H04L 9/3247* (2013.01); *G06F 3/1454* (2013.01); *G06F 21/606* (2013.01); *G06F 21/6209* (2013.01); *H04L 9/321* (2013.01); *H04L 12/1822* (2013.01); *H04L 12/1831* (2013.01); *H04L 65/1089* (2013.01); *H04L 65/403* (2013.01); *H04L 65/4015* (2013.01); *H04N 7/141* (2013.01); *H04N 7/147* (2013.01); *H04N 7/15* (2013.01); *G06F 2221/2115* (2013.01); *G09G 2358/00* (2013.01); *G09G 2370/022* (2013.01); *G09G 2370/025* (2013.01); *H04N 7/155* (2013.01)

(58) Field of Classification Search
CPC .. G06F 3/1454; G06F 21/606; G06F 21/6209; G06F 2221/2115; G09G 2358/00; G09G 2370/022; G09G 2370/025; H04L 9/321; H04L 9/3247; H04L 12/1822; H04L 12/1831; H04L 65/1089; H04L 65/4015; H04L 65/403; H04N 7/141; H04N 7/147; H04N 7/15; H04N 7/155
See application file for complete search history.

(56) References Cited

U.S. PATENT DOCUMENTS 10,855,732 B2 * 12/2020 Aggarwal ............. G06F 40/174

* cited by examiner

*Primary Examiner* — Thomas J Dailey

(57) ABSTRACT

The system comprises a first data processing system, a second data processing system, and a server. The system further includes four screens. The first and third screen comprises a video stream and an audio stream. The second and fourth screen comprises a video stream displaying visual contents of a first document that is to be digitally signed by the first and second user. The first and second data processing systems are configured to receive a first and second unique signature from the first and second user, respectively, and add it to the first document. The server is configured to coordinate communication between the first and second data processing systems, record the visual contents of the first screen, the second screen, the third screen and the fourth screen, and store the recording.

18 Claims, 18 Drawing Sheets

(51) Int. Cl.
*H04N 7/15* (2006.01)
*G06F 3/14* (2006.01)

SYSTEM ENABLING DIGITAL SIGNATURE OF A DOCUMENT IN AN ONLINE MEETING

BACKGROUND

Field

The disclosed subject matter relates to the field of digitally signing a document in an online meeting. More particularly, but not exclusively, the subject matter relates to screen sharing, document signing and storage of recording associated with online meeting as evidence.

Discussion of Related Field

The ubiquitous characteristic of the internet coupled with the massive technological growth in electronic communication devices has had a paradigm shift in the way people communicate and network with each other. More particularly, video conferencing has grown into daily routine to connect with people. This advancement in technology has enabled many other features as well such as digitally signing documents online.

However, the ever need for security whenever a new feature is introduced is a given. An additional layer of security that cannot be tampered with is required on top of the existing encrypted connections ability. None of the existing systems disclose a tool that may record the conversation or video meeting taking place when the users are signing the document. Recording the conversation along with the video recording of the approval from the users, ensures that the document was verified and understood by the end user. This further ensures that, in future, the chances of refuting the signature are minimal.

Additionally, the recorded video could be added to the document along with the digital signature, which is a highly desirable feature when signing important documents.

In light of the above, it is apparent that there is a need for an improved system for enabling digitally signing of documents and recording the video conference screens as additional proof.

SUMMARY

In one embodiment, a system enabling digital signature of a document in an online meeting. The system may comprise a first data processing system associated with a first user, wherein the first data processing system may comprise a first processor module and a first digital client, the first processor module causing the first digital client to individually share at least a first screen and a second screen. A second data processing system associated with a second user, wherein the second data processing system may comprise a second processor module and a second digital client, the second processor module causing the second digital client to individually share at least a third screen and a fourth screen, wherein, the first digital client shares the first screen and the second screen while the second digital client shares the third screen and the fourth screen. The first digital client may comprise a first digital client display interface, wherein the first digital client displays in the first digital client display interface, visual content of the first screen, the second screen, the third screen and the fourth screen in individual display windows. The second digital client may comprise a second digital client display interface, wherein the second digital client displays in the second digital client display interface, visual content of the first screen, the second screen, the third screen and the fourth screen in individual display windows. The first screen may comprise a video stream and an audio stream, obtained from a first camera and a first microphone, respectively, connected to the first data processing system. The second screen may comprise a video stream displaying visual contents of a first document that is to be digitally signed by the first user and the second user. The third screen may comprise a video stream and an audio stream, obtained from a second camera and a second microphone, respectively, connected to the second data processing system. The fourth screen may comprise a video stream displaying visual contents of the first document that is to be digitally signed by the first user and the second user. The first data processing system may be configured to receive a first unique signature from the first user and add the first unique signature to the first document, wherein the first unique signature represents the first user. The second data processing system may be configured to receive a second unique signature from the second user and add the second unique signature to the first document, wherein the second unique signature represents the second user. A server, wherein the server may be configured to coordinate communication between the first data processing system and the second data processing system. Record the visual contents of the first screen, the second screen, the third screen and the fourth screen based on an instruction received from the first user and store the recording of the visual contents of the first screen, the second screen, the third screen and the fourth screen.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
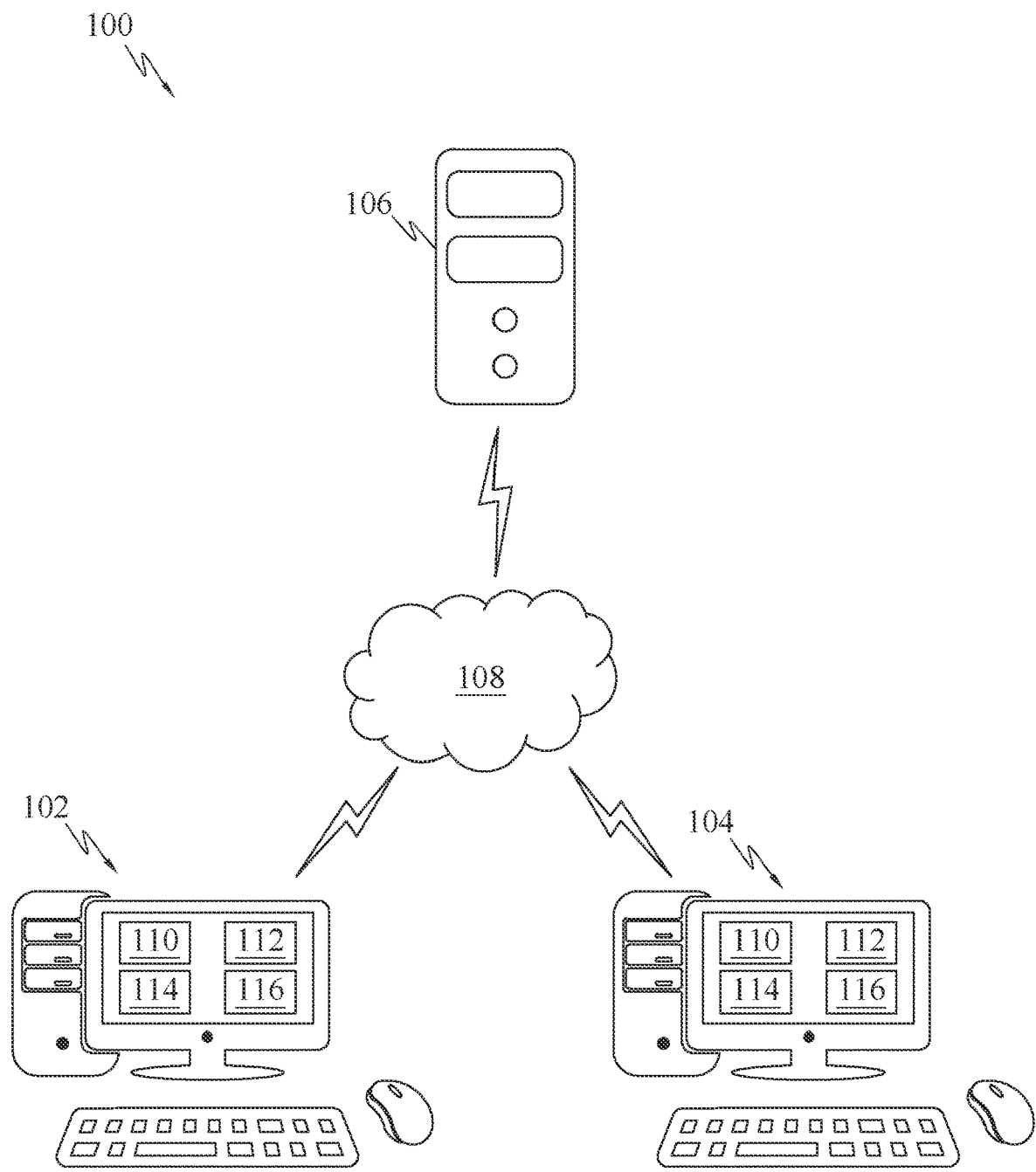
FIG. 1 illustrates a system for enabling multiple screens sharing in an online meeting, in accordance with an embodiment.

FIG. 1 illustrates a system 100 for enabling multiple screens sharing in an online meeting, in accordance with an embodiment. The system may comprise a first data processing system 102, a second data processing system 104, a communication network 108 and a server 106. The first data processing system 102 may individually share a first screen 110 and a second screen 112 and similarly the second data processing system 104 may share a third screen 114 and a fourth screen 116. The screen sharing between the first data processing system 102 and the second data processing system 104 may happen simultaneously.

In one embodiment, the first data processing system 102 and the second data processing system 104 may include, but not limited to, desktop computer, laptop, smartphone or the like.

Figure 2:
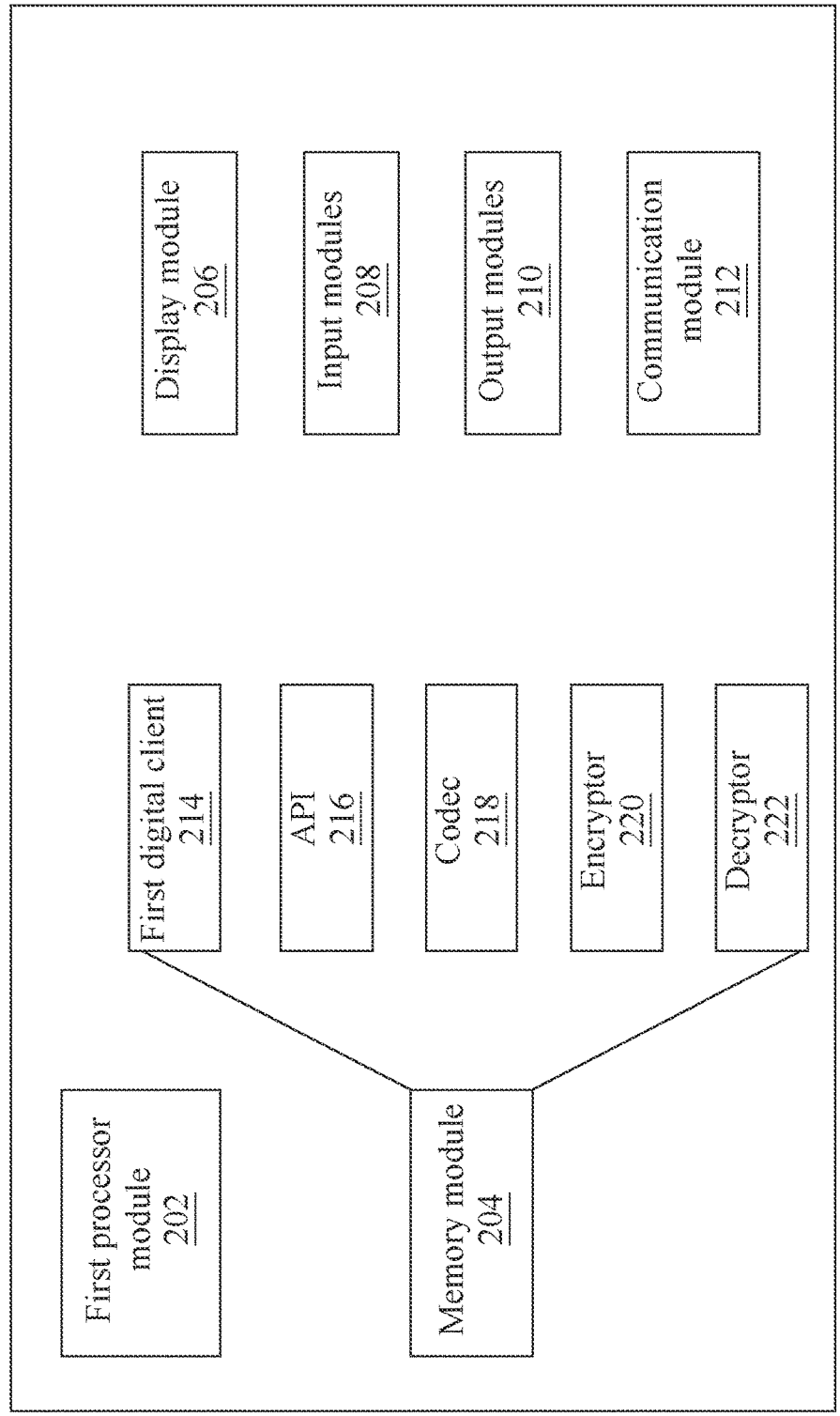
FIG. 2 is a block diagram illustrating a first data processing system 102, in accordance with an embodiment.

FIG. 2 is a block diagram illustrating a first data processing system 102, in accordance with an embodiment. The first data processing system 102 may comprise a first processor module 202, a memory module 204, a display module 206, input modules 208, output modules 210 and a communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The memory module 204 may include a permanent memory such as hard disk drive, may be configured to store data, and executable program instructions that are implemented by the processor module. The memory module 204 may be implemented in the form of a primary and a secondary memory. The memory module 204 may store additional data and program instructions that are loadable and executable on the first processor module 202, as well as data generated during the execution of these programs. Further, the memory module 204 may be volatile memory, such as random-access memory and/or a disk drive, or non-volatile memory. The memory module 204 may comprise of removable memory such as a Compact Flash card, Memory Stick, Smart Media, Multimedia Card, Secure Digital memory, or any other memory storage that exists currently or may exist in the future.

In an embodiment, the memory module 204 may further comprise a first digital client 214, an Application Programming Interface (API) 216, a codec 218, an encryptor 220 and a decryptor 222. The first digital client 214 may be a web browser or a software application enabling multiple screen sharing simultaneously, wherein the first digital client 214 may further comprise a first digital client display interface. The codec 218 may include computer-executable or machine-executable instructions written in any suitable programming language to perform compress outgoing data and decompress incoming data. The encryptor 220 may encrypt the data being sent and decryptor 222 may decrypt the incoming data.

The display module 206 may display an image, a video, or data to a user. For example, the display module 206 may include a panel, and the panel may be an LCD, LED or an AM-OLED.

The input modules 208 may provide an interface for input devices such as keypad, touch screen, mouse and stylus among other input devices. In an embodiment, the input modules 208 includes a camera and a microphone.

The output modules 210 may provide an interface for output devices such as display screen, speakers, printer and haptic feedback devices, among other output devices.

The communication module 212 may be used by the first data processing system 102 to communicate with the server 106. The communication module 212, as an example, may be a GPRS module, or other modules that enable wireless communication.

Figure 3:
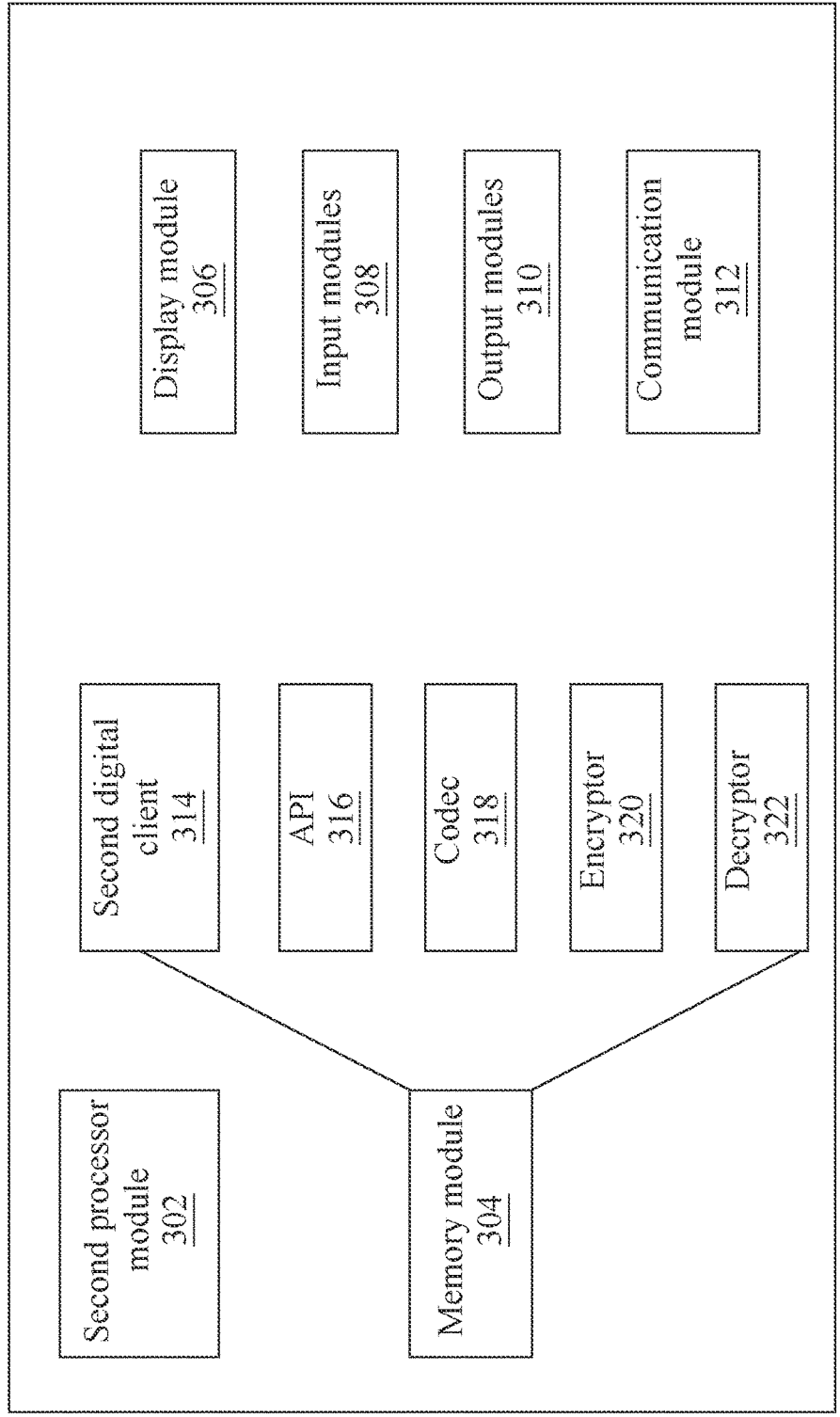
FIG. 3 is a block diagram illustrating a second data processing system 104, in accordance with an embodiment.

The second data processing system 104 may comprise a similar architecture to the first data processing system 102. FIG. 3 is a block diagram illustrating a second data processing system 104, in accordance with an embodiment. The second data processing system 104 may comprise a second processor module 302, a memory module 304 with a second digital client 314, a display module 306, input modules 308, output modules 310 and a communication module 312.

Figure 4:
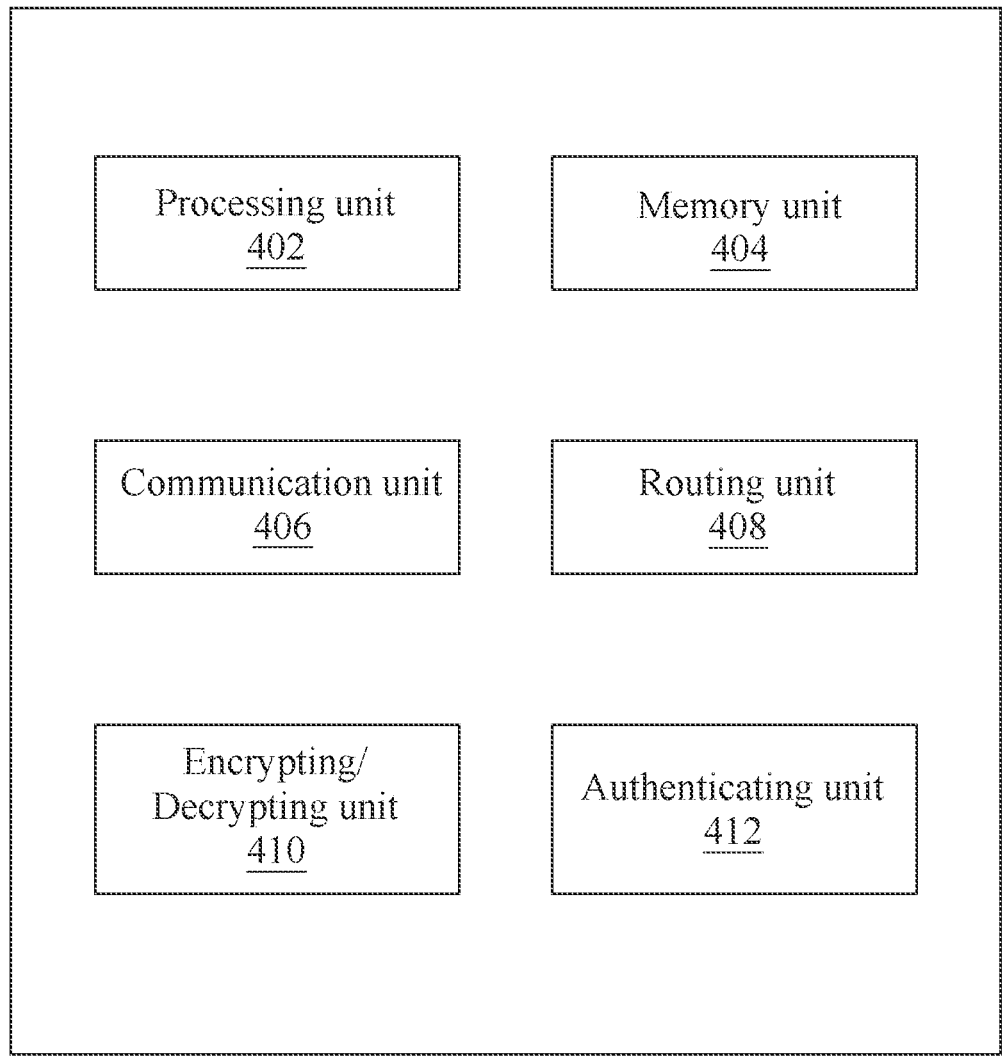
FIG. 4 is a block diagram illustrating a server 106, in accordance with an embodiment.

FIG. 4 is a block diagram illustrating a server 106, in accordance with an embodiment. The server 106 may comprise a processing unit 402, a memory unit 404, a communication unit 406, a routing unit 408, an encrypting/decrypting unit and an authenticating unit 412.

The processing unit 402 may be implemented in the form of one or more processors and may be implemented as appropriate in hardware, computer-executable instructions, firmware, or combinations thereof. Computer-executable instruction or firmware implementations of the processing unit 402 may include computer-executable or machine-executable instructions written in any suitable programming language to perform the various functions described.

The memory unit 404 may include a permanent memory such as hard disk drive, may be configured to store data, and executable program instructions that are implemented by the processor module.

The communication unit 406 may be used by the server 106 to communicate with the first data processing system 102 and the second data processing system 104. The communication unit 406, as an example, may be a GPRS module, or other modules that enable wireless communication.

The routing unit 408 may enable identification of data processing systems to which the data must be transmitted.

The encrypting/decrypting unit 410 may encrypt the incoming data from the first data processing system 102 and decrypt the outgoing data from the server 106.

The authenticating unit 412 may authenticate the first data processing system 102 and the second data processing system 104 before establishing a connection.

Figure 5:
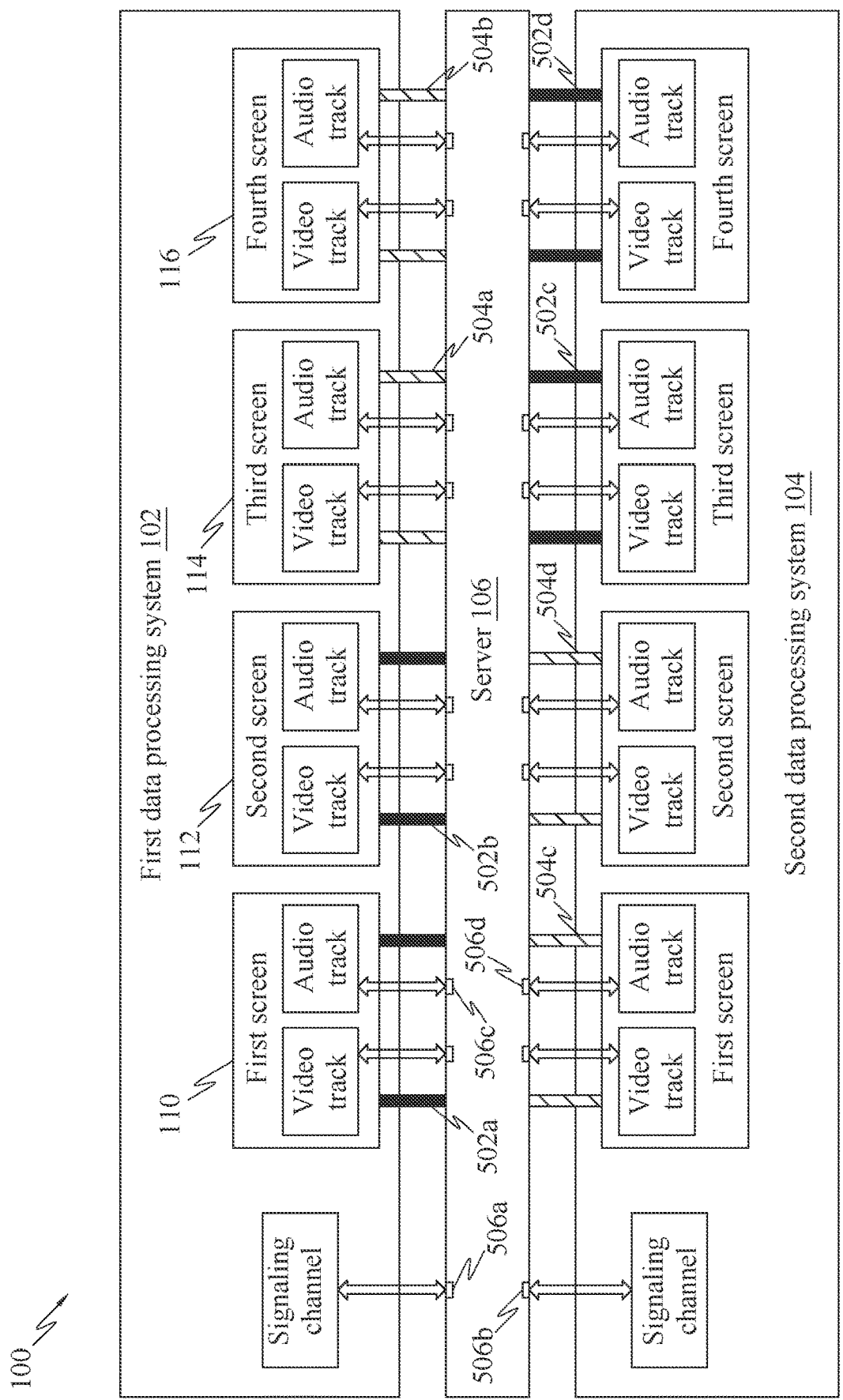
FIG. 5 illustrates an architecture of a system enabling multiple screens sharing in an online meeting, in accordance with an embodiment.

FIG. 5 illustrates an architecture of a system 100 enabling multiple screens sharing in an online meeting, in accordance with an embodiment. The first data processing system 102 may establish a connection with the server 106 via a UDP socket 506a using a signalling channel, wherein the first data processing system 102 may be authenticated by the user using the authenticating unit 412 of the server 106 before establishing a connection. Similarly, the second data processing system 104 may establish a connection with the first data processing system 102 via the server 106 via a UDP socket 506b using the signalling channel. The routing unit 408 of the server 106 may obtain the IP addresses of the first data processing system 102 and the second data processing system 104 and establish a connection between the two data processing systems.

After establishing the connection, the first processor module 202 of the first data processing system 102 may individually share the first screen 110 and the second screen 112 via the first digital client 214. Similarly, the second processor module 302 of the second data processing system 104 may individually share the third screen 114 and the fourth screen 116 via the second digital client 314. The first digital client 214 may share the first screen 110 and the second screen 112 while the second digital client 314 shares the third screen 114 and the fourth screen 116.

In one embodiment, the first digital client 214 may create a first publishing data channel (502a and 502b) for each of the screens shared by the first digital client 214, wherein each of the first publishing data channels (502a and 502b) may publish the screens (first screen 110 and second screen 112) shared by the first digital client 214. Similarly, the second digital client 314 may create a second publishing data channel (502c and 502d) for each of the screens shared by the second digital client 314, wherein each of the second publishing data channels (502c and 502d) may publish the screens (third screen 114 and the fourth screen 116) shared by the second digital client 314.

In one embodiment, each of the first publishing data channels (502a and 502b) and the second publishing data channels (502c and 502d) may comprise a video track and an audio track, wherein each of the video track and the audio track of each publishing data channel forms a UDP socket (506c and 506d) with the server 106 to share the video stream and audio stream of the screen.

In one embodiment, the first digital client 214 may create a first receiving data channel (504a and 504b) for each of the screens shared by the second digital client 314, wherein each of the first receiving data channels (504a and 504b) may receive the screens (third screen 114 and fourth screen 116) shared by the second digital client 314. Similarly, the second digital client 314 may create a second receiving data channel (504c and 504d) for each of the screens shared by the first digital client 214, wherein each of the second receiving data channels (504c and 504d) may receive the screens (first screen 110 and the second screen 112) shared by the first digital client 214.

Figure 6:
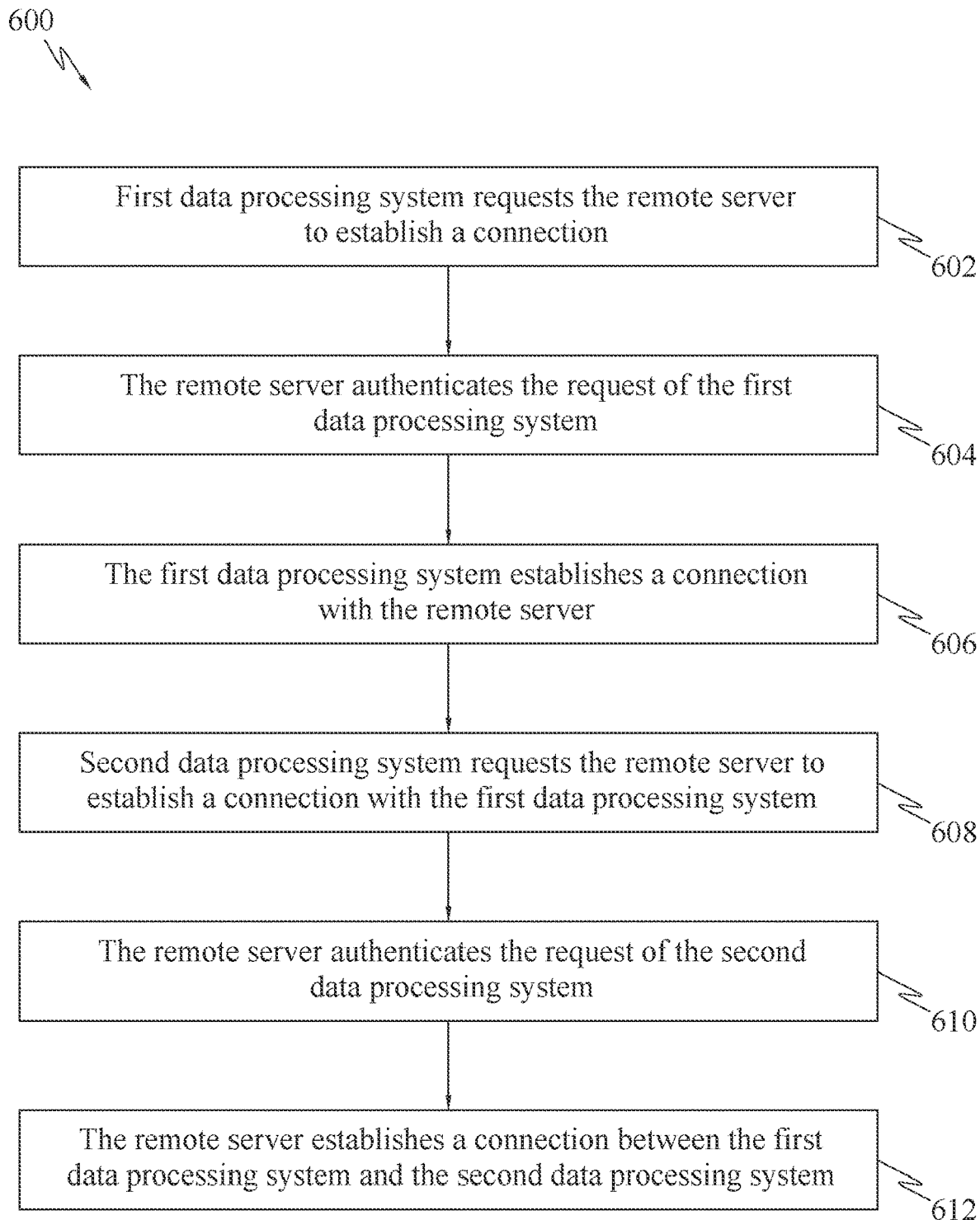
FIG. 6 is a flowchart of process of establishing a connection between the first data processing system 102 and the second data processing system 104.

FIG. 6 is a flowchart of process of establishing a connection between the first data processing system 102 and the second data processing system 104. At step 602, the first data processing system 102 may request the server 106 to establish a connection. The first data processing system 102 may send a series of messages or commands requesting the server 106 to establish a connection.

At step 604, the server 106 may receive the request from the first data processing system 102 and may authenticate the request using the authenticating unit 412.

At step 606, after successful authentication, the server 106 may establish a connection with the first data processing system 102 via the signaling channel.

At step 608, the second data processing system 104 may request the server 106 to establish a connection with the first data processing system 102. As an example, the second data processing system 104 may provide an online meeting identifier for connecting with the first data processing system 102.

At step 610, the server 106 may authenticate the request received from the second data processing system 104 using the authenticating unit 412.

At step 612, after successful authentication, the server 106 may establish a connection between the first data processing system 102 and the second data processing system 104 using the signalling channels.

Figure 7:
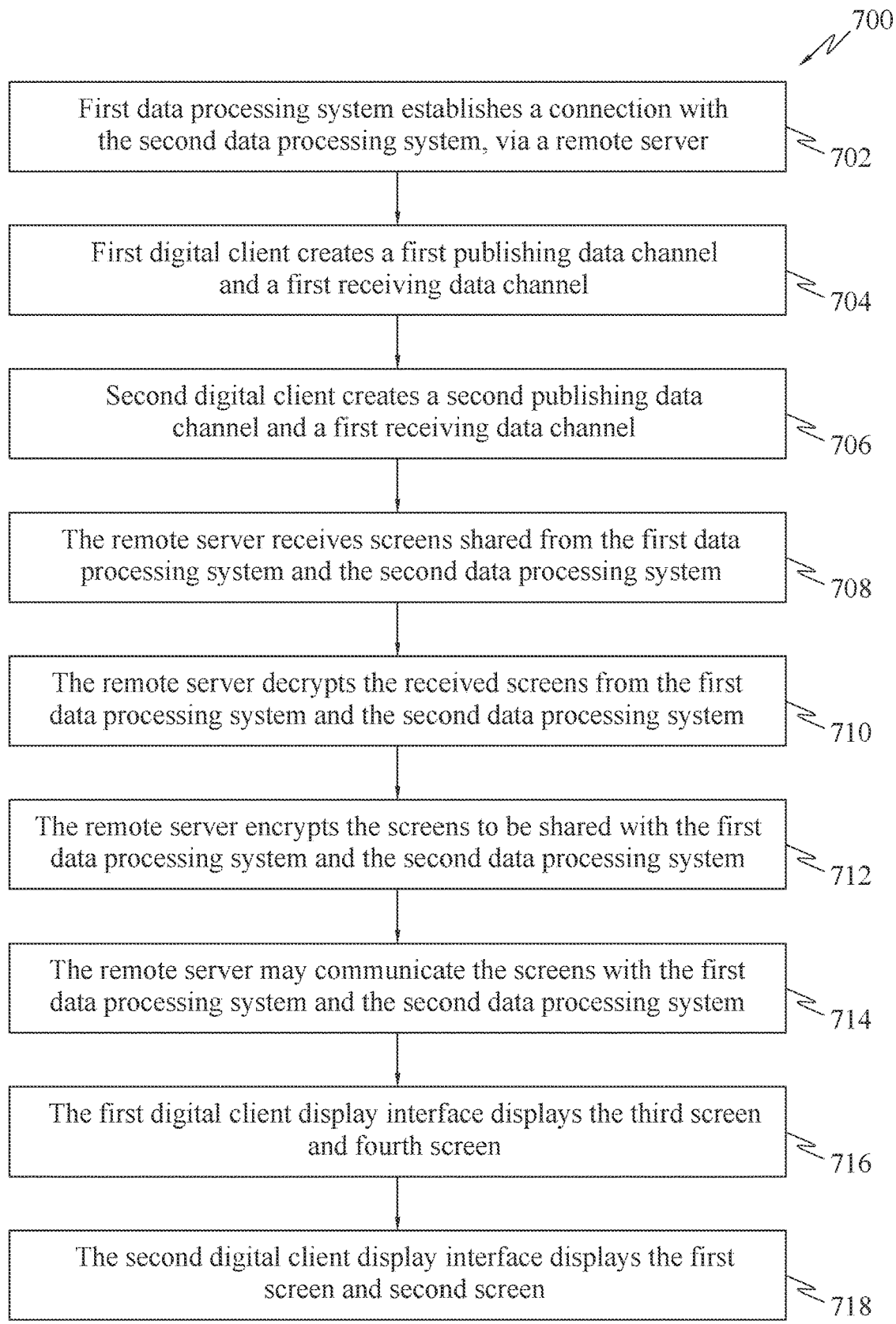
FIG. 7 is flowchart of steps for sharing multiple screens during an online meeting, in accordance with an embodiment.

FIG. 7 is flowchart of steps for sharing multiple screens during an online meeting, in accordance with an embodiment. At step 702, as explained in FIG. 6, the first data processing system 102 and the second data processing system 104 may establish a connection for an online meeting between them.

At step 704, the first digital client 214 may create a first publishing data channel (502a and 502b) for each of the screens shared by the first digital client 214, wherein each of the first publishing data channels (502a and 502b) may publish the screens (first screen 110 and second screen 112) shared by the first digital client 214. Further, the first digital client 214 may create a first receiving data channel (504a and 504b) for each of the screens shared by the second digital client 314, wherein each of the first receiving data channels (504a and 504b) may receive the screens (third screen 114 and fourth screen 116) shared by the second digital client 314.

Similarly, at step 706, the second digital client 314 may create a second publishing data channel (502c and 502d) for each of the screens shared by the second digital client 314, wherein each of the second publishing data channels (502c and 502d) may publish the screens (third screen 114 and the fourth screen 116) shared by the second digital client 314. Further, the second digital client 314 may create a second receiving data channel (504c and 504d) for each of the screens shared by the first digital client 214, wherein each of the second receiving data channels (504d and 504d) may receive the screens (first screen 110 and the second screen 112) shared by the first digital client 214.

In one embodiment, the codec (218 and 318) of the first data processing system 102 and the second data processing system 104 may compress the screens before sharing them with the server 106. Further, the encryptor (220 and 320) of the first data processing system 102 and the second data processing system 104 may encrypt the screens before sharing with the server 106.

In one embodiment, the first screen 110 may comprise a video stream and an audio stream, obtained from a first camera and a first microphone, respectively, connected to the first data processing system 102 and the third screen 114 may comprise a video stream and an audio stream, obtained from a second camera and a second microphone, respectively, connected to the second data processing system 104.

In one embodiment, the second screen 112 may comprise a video stream and an audio stream, obtained from a first software application present on the first data processing system 102, wherein the video stream and the audio stream obtained from the first software application is independent of the first camera and the first microphone and the fourth screen 116 may comprise a video stream and an audio stream, obtained from a second software application present on the second data processing system 104, wherein the video stream and the audio stream obtained from the second software application is independent of the second camera and the second microphone. As an example, the second screen 112 and the fourth screen 116 may be a window of a media player playing a video, a presentation so on and so forth.

At step 708, the server 106 may receive the screens published from the first digital client 214 and the second digital client 314 via the first publishing data channels (502a and 502b) and the second publishing data channels (502c and 502d) respectively.

At step 710, the encrypting/decrypting unit 410 of the server 106 may decrypt the received screens from the first digital client 214 and the second digital client 314 via the first publishing data channels (502a and 502b) and the second publishing data channels (502c and 502d) respectively.

At step 712, the encrypting/decrypting unit 410 of the server 106 may encrypt the decrypted screens received from the first digital client 214 and the second digital client 314. The encryption protocol may be dependent on the data processing systems with which the screens are shared.

At step 714, the server 106 may communicate the encrypted screen shares with the first data processing system 102 and the second data processing system 104 via the first receiving data channels (504a and 504b) and the second receiving data channels (504c and 504d) respectively. The server 106 may send the screens to appropriate data processing systems using the routing unit 408, wherein the IP addresses of the data processing systems are used to communicate the screens.

At step 716, the first digital client display interface may display the visual content of the third screen 114 and the fourth screen 116 on the display module 206 of the first data processing system 102. In one embodiment, the visual content of the third screen 114 and the fourth screen 116 may be displayed in individual display windows.

At step 718, the second digital client display interface may display the visual content of the first screen 110 and the second screen 112 on the display module 206 of the second data processing system 104. In one embodiment, the visual content of the first screen 110 and the second screen 112 may be displayed in individual display windows.

In one embodiment, the first processor module 202 may cause the first digital client 214 to publish the visual content of the first screen 110 and the second screen 112 in the individual display windows of the first digital client display interface, by sourcing the visual content corresponding to the first screen 110 and the second screen 112 locally within the first data processing system 102, without requiring the server 106 to send the visual content of the first screen 110 and the second screen 112 to the first data processing system 102. Similarly, the second processor module 302 may cause the second digital client 314 to publish the visual content of the third screen 114 and the fourth screen 116 in the individual display windows of the second digital client display interface, by sourcing the visual content corresponding to the third screen 114 and the fourth screen 116 locally within the second data processing system 104, without requiring the server 106 to send the visual content of the third screen 114 and the fourth screen 116 to the second data processing system 104.

In one embodiment, the first digital client display interface may display the visual content of the first screen 110 and the second screen 112 (locally sourced) and the third screen 114 and the fourth screen 116 received via the first receiving data channels (504a and 504b). Similarly, the second digital client display interface may display the visual content of the third screen 114 and the fourth screen 116 (locally sourced) and the first screen 110 and the second screen 112 received via the second receiving data channels (504c and 504d).

Figure 8:
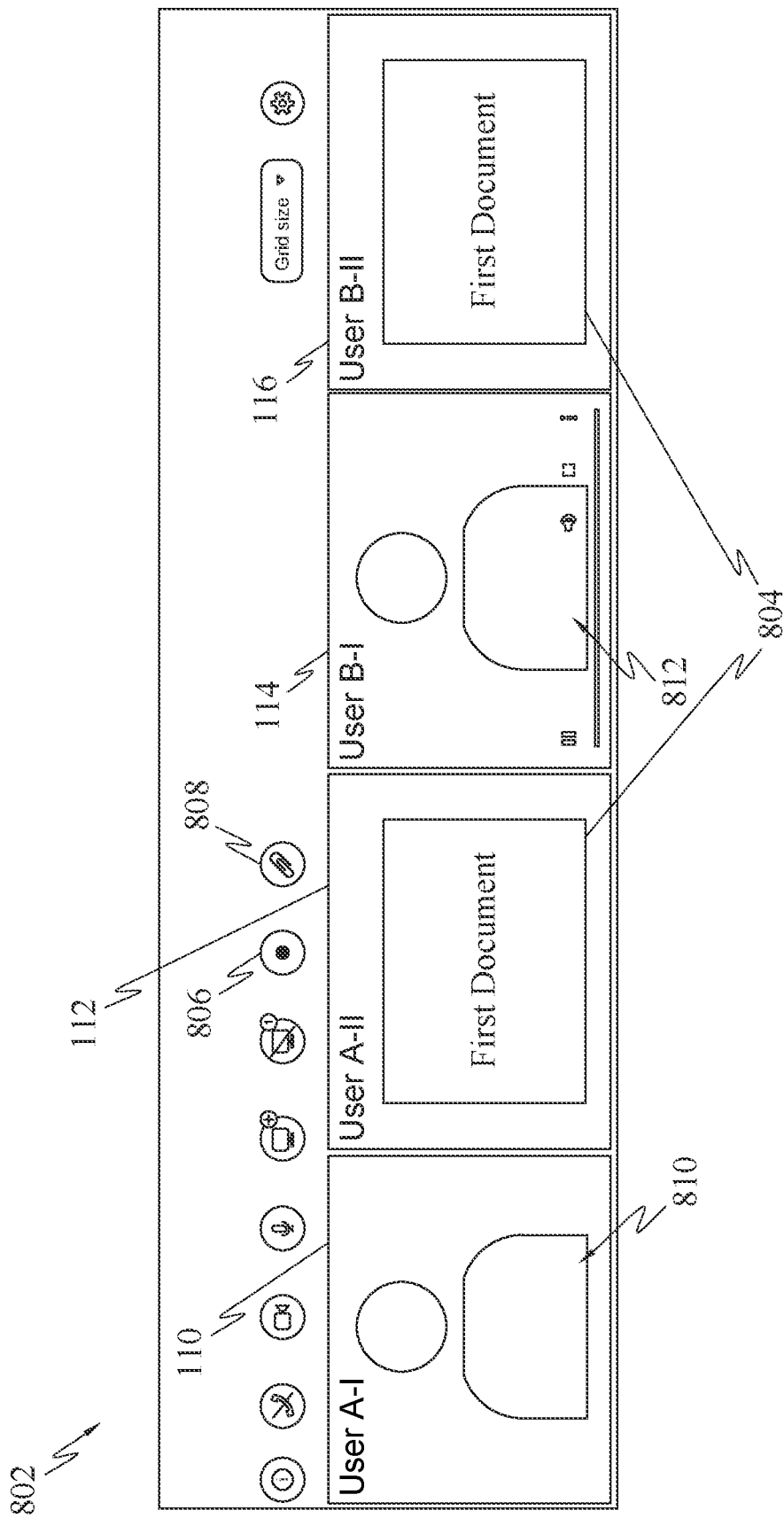
FIG. 8, illustrates the contents being displayed on a first digital client display interface 802 when a first document 804 is digitally signed during an online meeting, in accordance with an embodiment.

FIG. 8, illustrates the contents being displayed on a first digital client display interface 802 when a first document 804 is digitally signed during an online meeting, in accordance with an embodiment. The first digital client display interface 802 may display the visual content of the first screen 110, the second screen 112, the third screen 114 and the fourth screen 116 in individual windows simultaneously. Similarly, second digital client display interface may display the visual content of the first screen 110, the second screen 112, the third screen 114 and the fourth screen 116 in individual windows simultaneously.

The first screen 110 may comprise a video stream and an audio stream obtained from the first camera and the first microphone respectively. The second screen 112 may comprise a video stream displaying visual contents of the first document 804 that may be digitally signed by the first user 810 and the second user 812. The third screen 114 may comprise a video stream and an audio stream obtained from the second camera and the second microphone respectively. The fourth screen 116 may comprise a video stream displaying visual contents of the first document 804 that may be digitally signed by the first user 810 and the second user 812.

According to the same embodiment, the first data processing system 102 may be configured to receive from the first user 810 a first unique signature 1004 associated with the first user 810 and may add the first unique signature 1004 to the first document 804. Similarly, the second data processing system 104 may be configured to receive from the second user 812 a second unique signature 1006 associated with the second user 812 and may add the second unique signature 1006 to the first document 804.

According to an embodiment, a server 106 may be configured to coordinate communication between the first data processing system 102 and the second data processing system 104.

In one embodiment, the server 106 may further be configured to record the visual contents of the first screen 110, the second screen 112, the third screen 114 and the fourth screen 116 based on an instruction received from the first user 810.

In one embodiment, the first digital client display interface 802 may be configured to include a record icon 806, wherein activation of the record icon enables recording of the online meeting.

In another embodiment, the server 106 may be configured to store the recording of the visual contents of the first screen 110, the second screen 112, the third screen 114 and the fourth screen 116.

Figure 9:
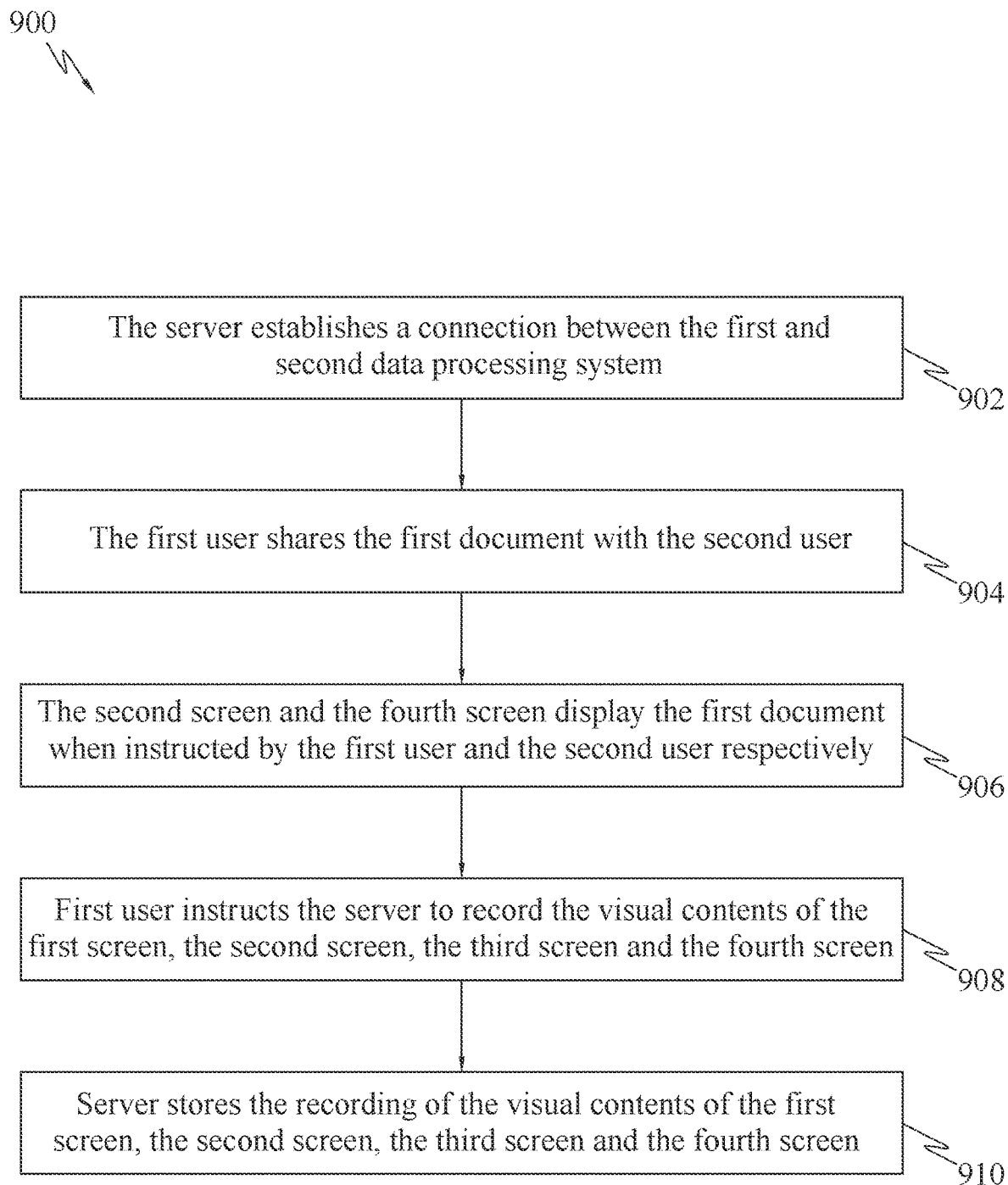
FIG. 9 is flowchart of steps for signing of a first document during an online meeting, in accordance with an embodiment.

FIG. 9 is flowchart of steps for signing of a first document 804 during an online meeting, in accordance with an embodiment. At step 902, the server 106 may establish a connection for an online meeting between the first data processing system 102 and the second data processing system 104. Visual content of the first screen 110, the second screen 112, the third screen 114 and the fourth screen 116 may be displayed in individual display windows on the first digital client display interface and the second digital client display interface.

At step 904, the first user 810 may share the first document 804 with the second user 812 associated with the second data processing system 104.

In one embodiment, the first user 810 may share the first document 804 with the second user 812 via the server 106 upon establishing the connection between the first data processing system 102 and the second data processing system 104.

In one embodiment, the first digital client display interface 802 may be configured to include an attach file icon 808, wherein upon clicking the attach file icon 808, a pop-up window may be displayed, wherein the first user 810 may choose the first document 804 stored on the first data processing system 102 to be shared with the second user 812 thereby sharing the first document 804 with the first user 810.

At step 906, the first user 810 may instruct the first data processing system 102 to display the first document 804 on the second screen 112. Similarly, the second user 812 may instruct the second data processing system 104 to display the first document 804 on the fourth screen 116.

In the same embodiment, the first screen 110 may comprise a video stream and an audio stream obtained from the first camera and the first microphone respectively. The third screen 114 may comprise a video stream and an audio stream obtained from the second camera and the second microphone respectively.

At step 908, the first user 810 may instruct the server 106 to record the visual contents of the first screen 110, the second screen 112, the third screen 114 and the fourth screen 116.

In one embodiment, the server 106 may be configured to record the visual contents of the first screen 110, the second screen 112, the third screen 114 and the fourth screen 116, upon activating the record icon 806.

At step 910, the server 106 may store the recording of the visual contents of the first screen 110, the second screen 112, the third screen 114 and the fourth screen 116.

In one embodiment, the first data processing system 102 and the second data processing system 104 may be configured to access the first document 804 simultaneously.

According to another embodiment, the first document 804 may further include the hyperlink 1002 of the video recorded and stored by the server 106.

Figure 10:
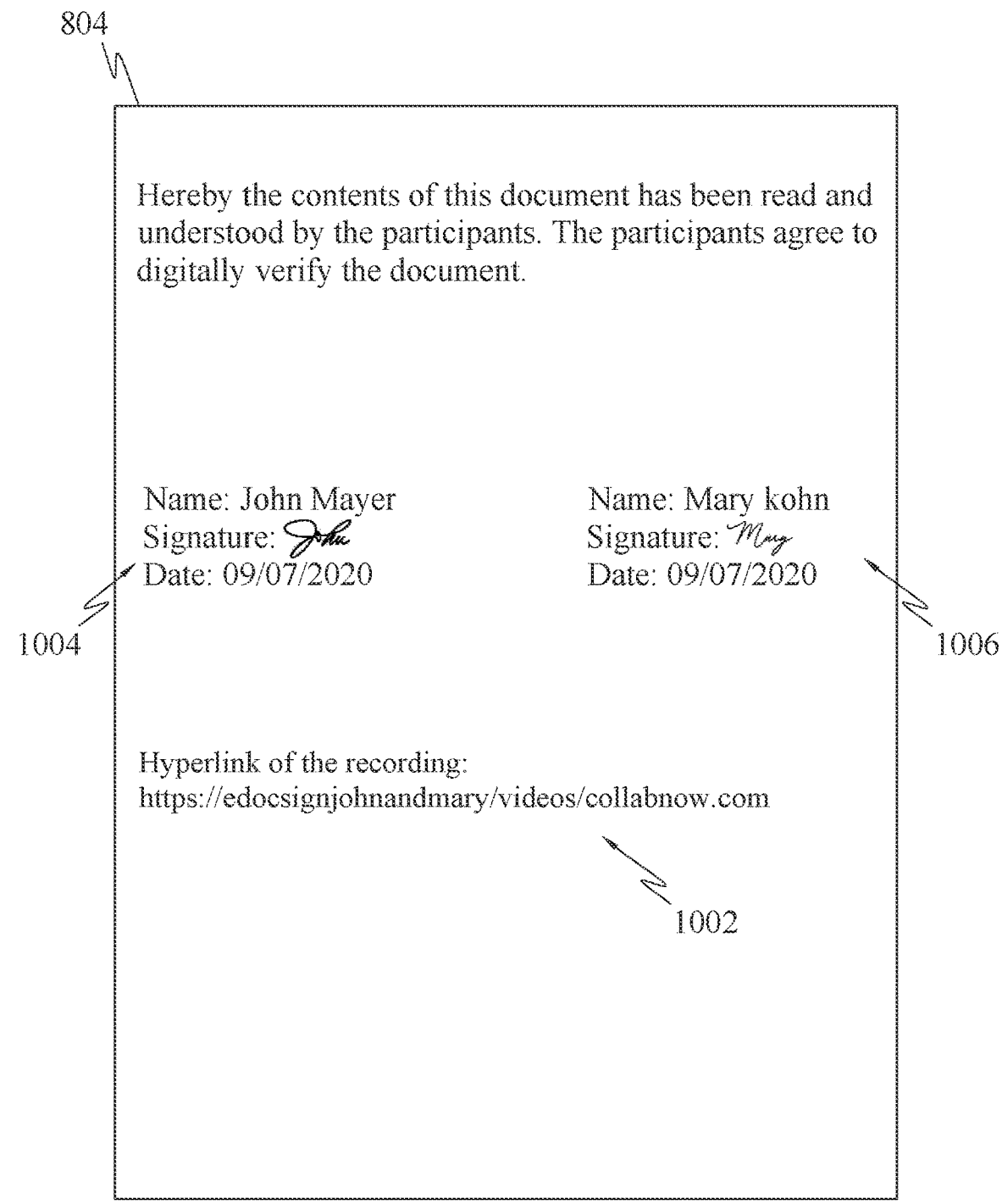
FIG. 10, illustrates the contents of the first document being displayed to the first user and the second user.

FIG. 10, illustrates the contents of the first document 804 being displayed to the first user 810 and the second user 812.

In one embodiment, the first unique signature 1004 and the second unique signature 1006 may be, but not limited to, a unique alpha-numeric string, unique image, and so on.

In one embodiment, the second data processing system 104 may receive the first document 804 from the first data processing system 102 after the first document 804 has been digitally signed by the first user 810 i.e; the first unique signature 1004 is added to the first document 804. Further, the second data processing system 104 may send the first document 804 to the third processing system to be digitally verified by the third user after the second unique signature 1006 is added to the first document 804.

In an embodiment, the server 106 may be configured to receive an instruction from the first user 810 to allow or disallow the second user 812 to access the second screen 112 shared by the first data processing system 102. The server 106 may further be configured to add the second unique signature 1006 associated with the second user 812 to the first document 804 shared in the second screen 112.

Figure 11:
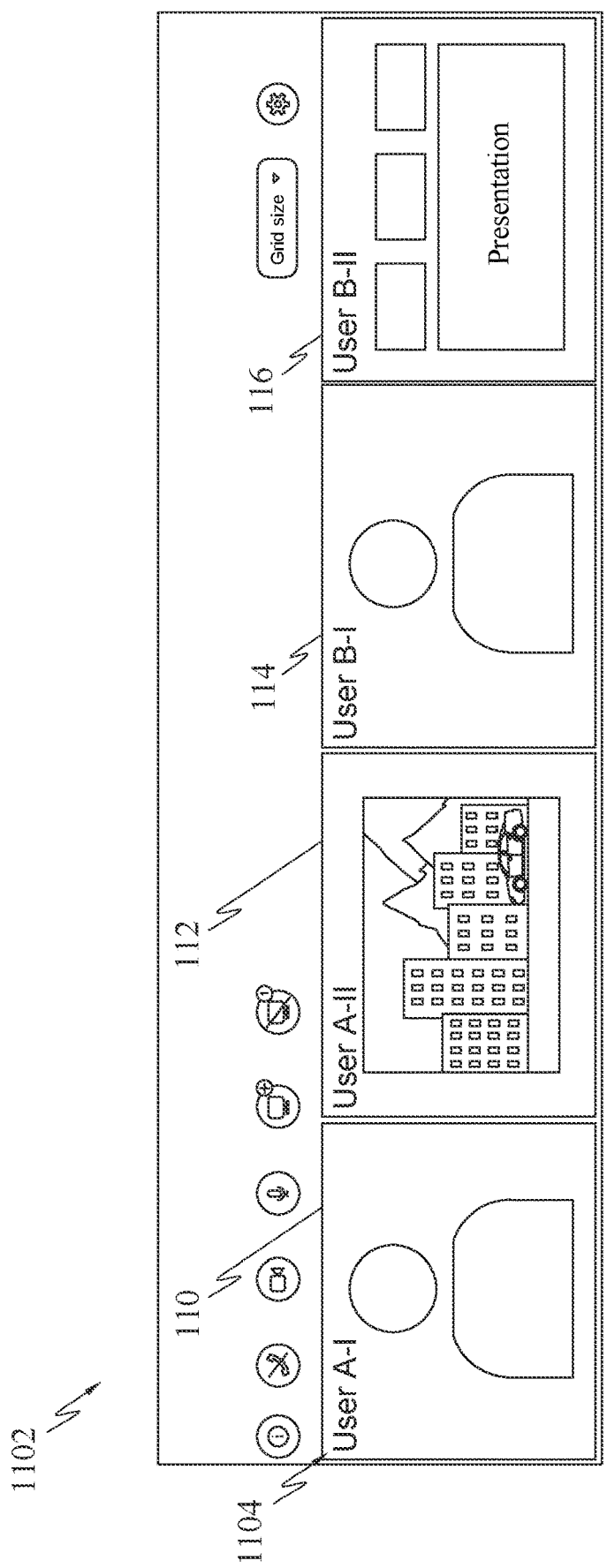
FIG. 11 illustrates a first digital client display interface 1102, in accordance with an embodiment.

FIG. 11 illustrates a first digital client display interface 1102, in accordance with an embodiment. The first digital client display interface 1102 may display the visual content of the first screen 110, the second screen 112, the third screen 114 and the fourth screen 116 in individual windows simultaneously. Each of the windows may be provided with an identity 1104 and the identity may be displayed in the first digital client 214 and the second digital client 314, wherein the identity may represent the digital client from which the screen is published. Similarly, second digital client display interface may display the visual content of the first screen 110, the second screen 112, the third screen 114 and the fourth screen 116 in individual windows simultaneously as shown in FIG. 11.

In one embodiment, the server 106 may record an identity 1104 for each of the screens shared by the first digital client 214 and the second digital client 314 and further communicate the identity 1104 with the first digital client 214 and the second digital client 314.

In another embodiment, the server 106 may create an identity 1104 for each of the screens shared by the first digital client 214 and the second digital client 314.

In one embodiment, the identity 1104 for each of the screens shared by the first digital client 214 and the second digital client 314 may comprise an image. As an example, the image may be profile picture of the user of the digital client.

In one embodiment, each of the identities 1104 may be unique compared to each other thereby enabling easier identification of the screens.

In one embodiment, each of the identities 1104 created for the screens shared may comprise a first portion and a second portion. The first portion may identify user of the first digital client 214 or the second digital client 314, whichever shared the screen, and the second portion may be unique compared to identities for screens shared by the same digital client.

Figure 12:
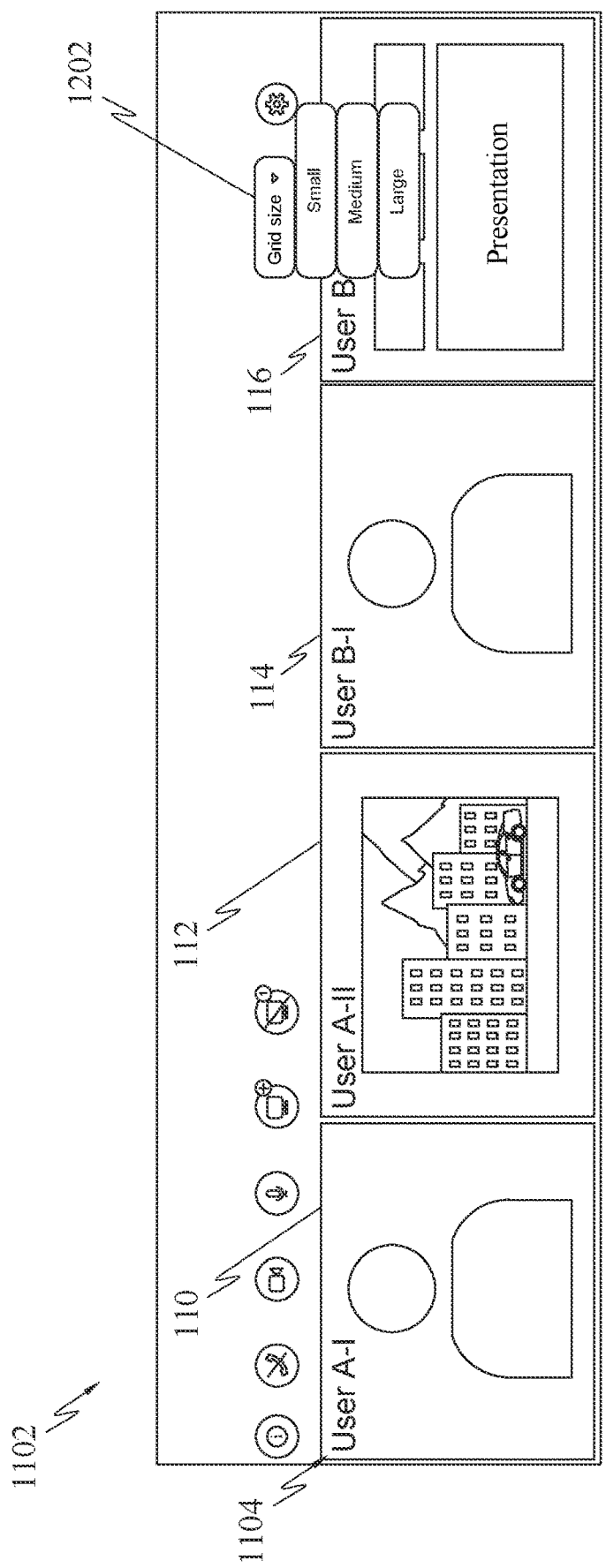
FIG. 12 is an illustration of the first digital client display interface 1102, in accordance with an embodiment.

FIG. 12 is an illustration of the first digital client display interface 1102, in accordance with an embodiment. The first digital client 214 may cause display in the first digital client display interface 1102, visual content of the first screen 110, the second screen 112, the third screen 114 and the fourth screen 116 in individual display windows, wherein the individual display windows of the first digital client display interface 1102 may be arranged in a grid of equally sized windows.

In one embodiment, the first processor module 202 may change the size of the individual display windows, of the first digital client display interface, simultaneously to equally sized larger or smaller sized windows based on an input received from a first user 810. As an example, the user may choose the window size such as small, medium or large from a grid size icon 1202 to simultaneously adjust the size of all the windows.

In one embodiment, the first processor module 202 may cause the first digital client 214 to move one of the individual display windows to a desired location within the first digital client display interface, based on an input received from a first user 810 of the first data processing system 102.

Figure 13:
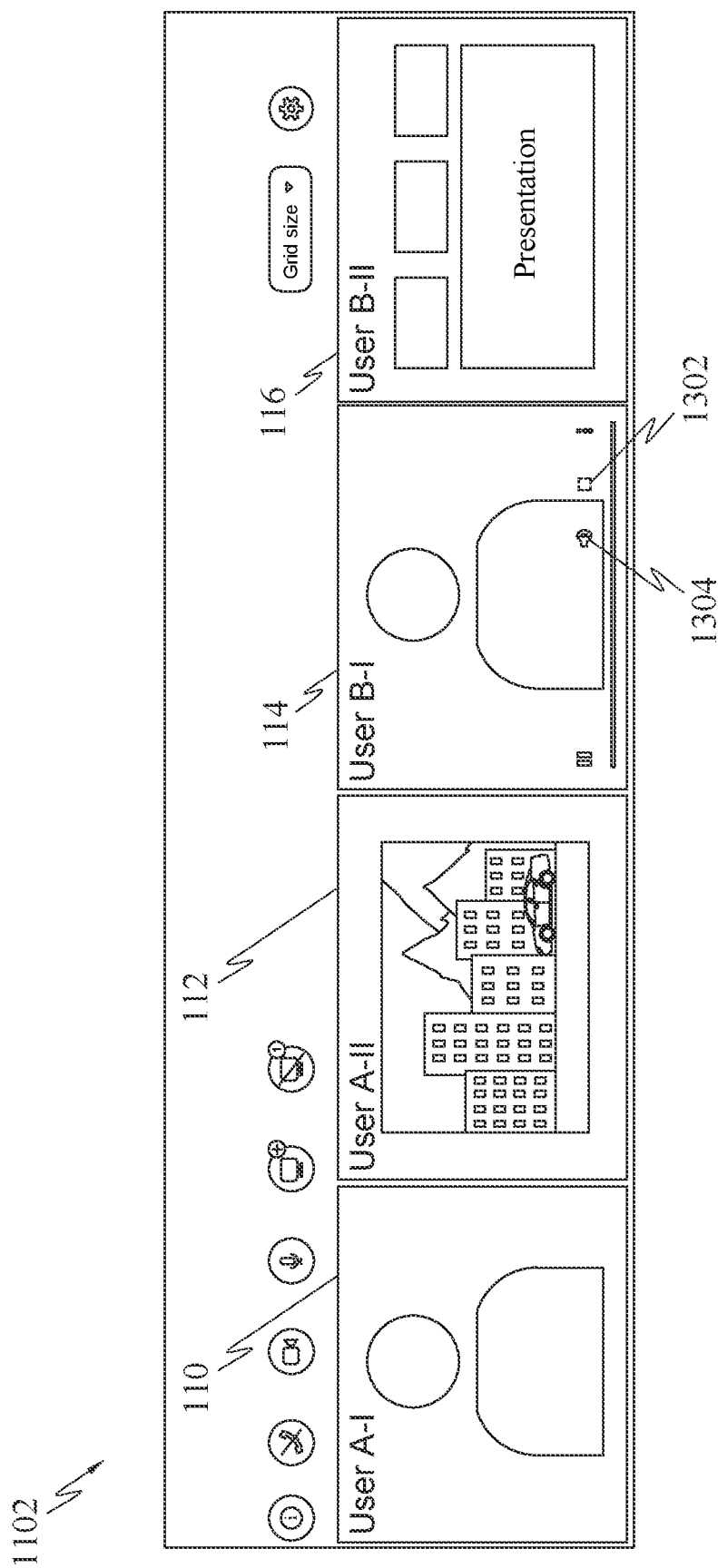
FIG. 13 illustrates the first digital client display interface 1102, in accordance with an embodiment.

FIG. 13 illustrates the first digital client display interface 1102, in accordance with an embodiment. The first processor module 202 may cause the first digital client 214 to change the size of one of the individual display windows of the first digital client display interface, based on an input received from a first user 810. As an example, the enlarge icon 1302 of a particular window may be activated to increase the size of that window.

In one embodiment, the first processor module 202 may cause the first digital client 214 to enable playing of the audio streams corresponding to the third screen 114 and the fourth screen 116. Similarly, the second processor module 302 may cause the second digital client 314 to enable playing of the audio streams corresponding to the first screen 110 and the second screen 112.

In another embodiment, based on input from a first user 810 of the first data processing system 102, the first processor module 202 may cause the first digital client 214 to selectively stop playing one or both of the audio streams corresponding to the third screen 114 and the fourth screen 116. As an example, the mute icon 1304 may be activated by the first user 810 to stop playing the audio stream from the third screen 114.

Figure 14:
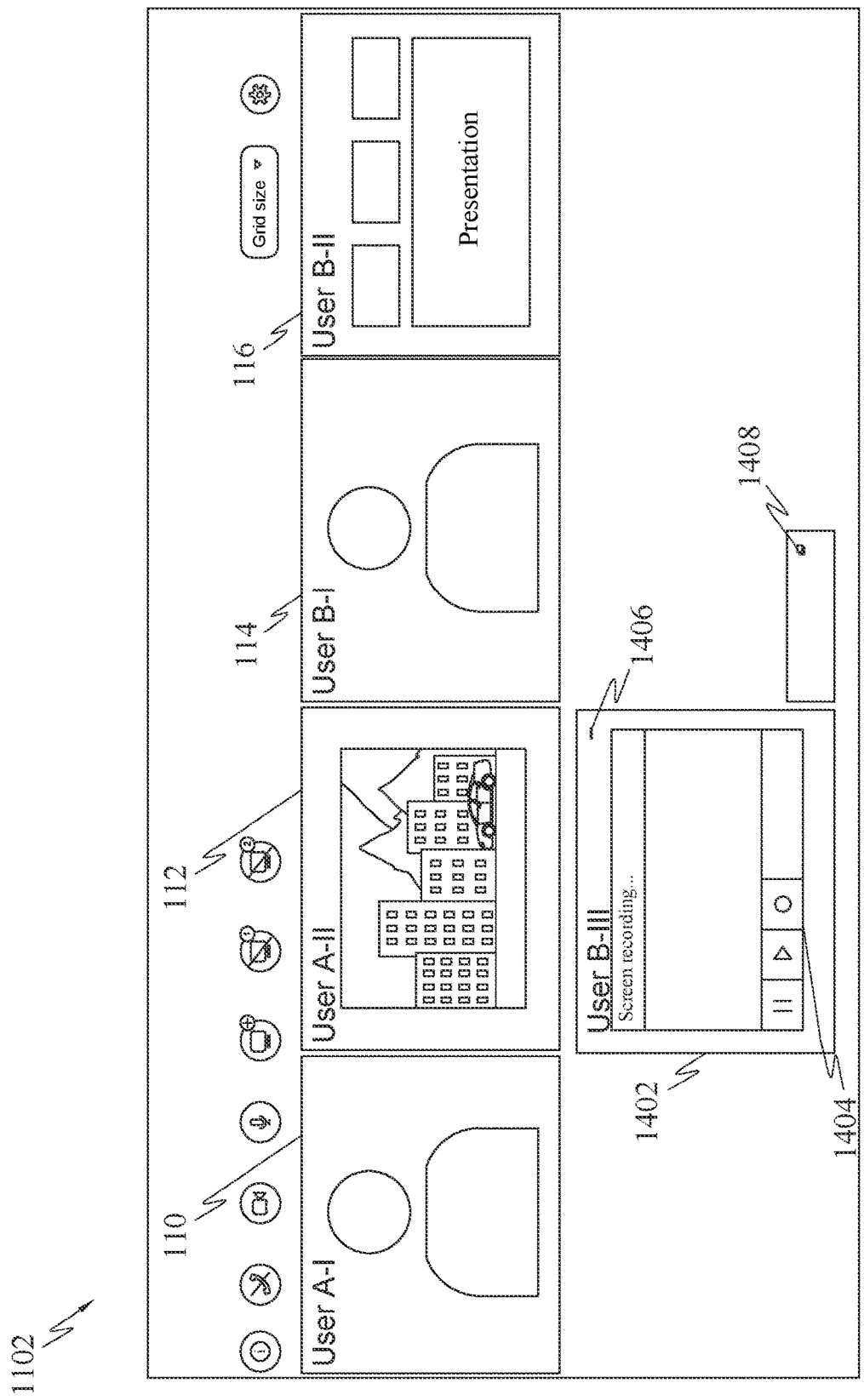
FIG. 14 illustrates the first digital client display interface 1102, in accordance with an embodiment.

FIG. 14 illustrates the first digital client display interface, in accordance with an embodiment. The first processor module 202, based on input from the first user 810 of the first data processing system 102, may enable the recording of audio-visual content of at least one of the screens displayed on the first digital client display interface. As an example, the record icon 1404 may be activated by the first user 810 to record a screen 1402 shared by the second digital client 314.

In one embodiment, the first processor module 202 may be configured to record audio-visual content of all the screens displayed on the first digital client 214.

In one embodiment, first processor module 202, based on an input received from a first user 810, may cause the first digital client 214 to minimize at least one of the individual display windows of the first digital client display interface 1102, while displaying the visual content in remaining of the of the individual display windows of the first digital client display interface 1102, which are not minimized. As an example, the minimize icon 1406 may be activated to minimize the window and the restore icon 1408 may be activated to restore the window to its original size.

Figure 15A:
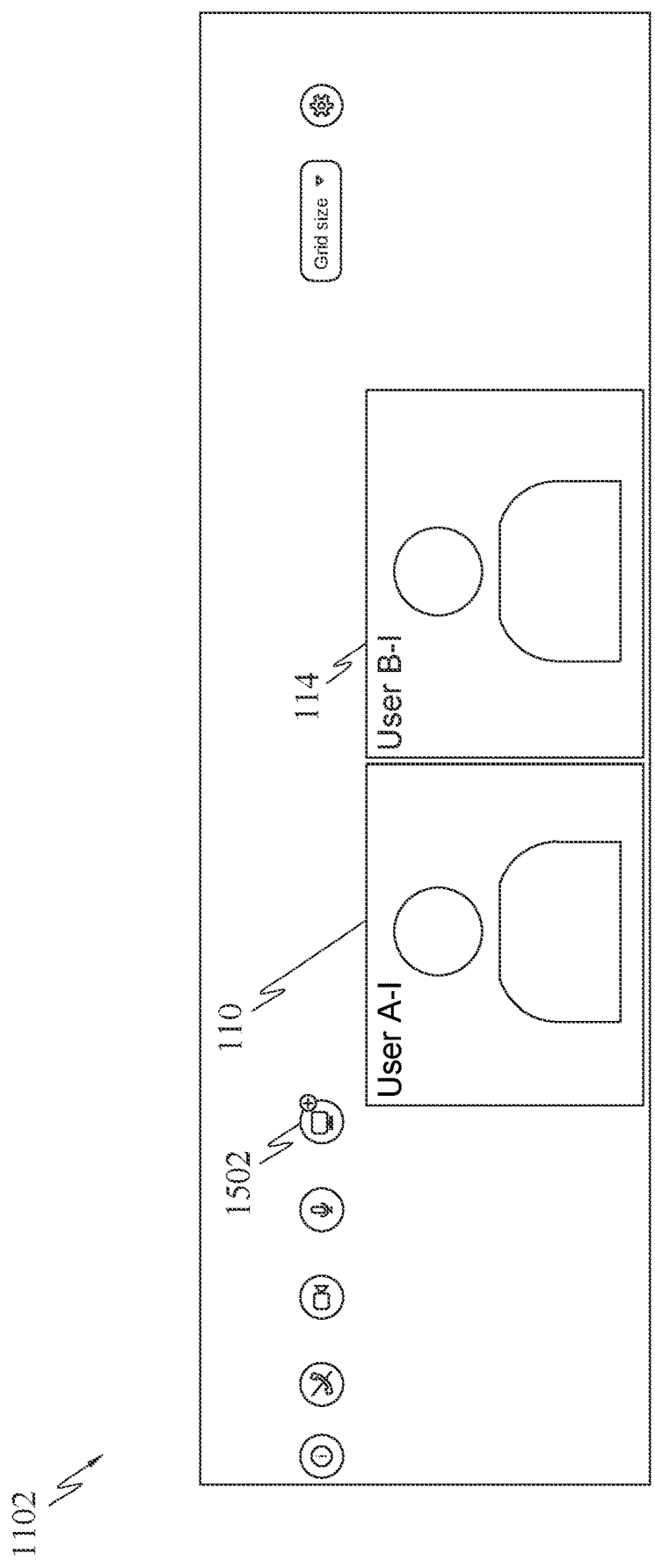
FIG. 15A illustrates the first digital client display interface 1102, in accordance with an embodiment.

FIGS. 15A-15D illustrates the process of sharing multiple screens in an online meeting, in accordance with an embodiment. Referring to FIG. 15A, the first digital client display interface 1102 may display the first screen 110 and the third screen 114. The first screen 110 may comprise a video stream and an audio stream, obtained from a first camera and a first microphone, respectively, connected to the first data processing system 102 and the third screen 114 may comprise a video stream and an audio stream, obtained from a second camera and a second microphone, respectively, connected to the second data processing system 104. The first digital client display interface 1102 may display a screen share icon 1502. The first user 810 of the first data processing system 102 may activate the screen share icon 1502 to share a screen with the second data processing system 104.

Figure 15B:
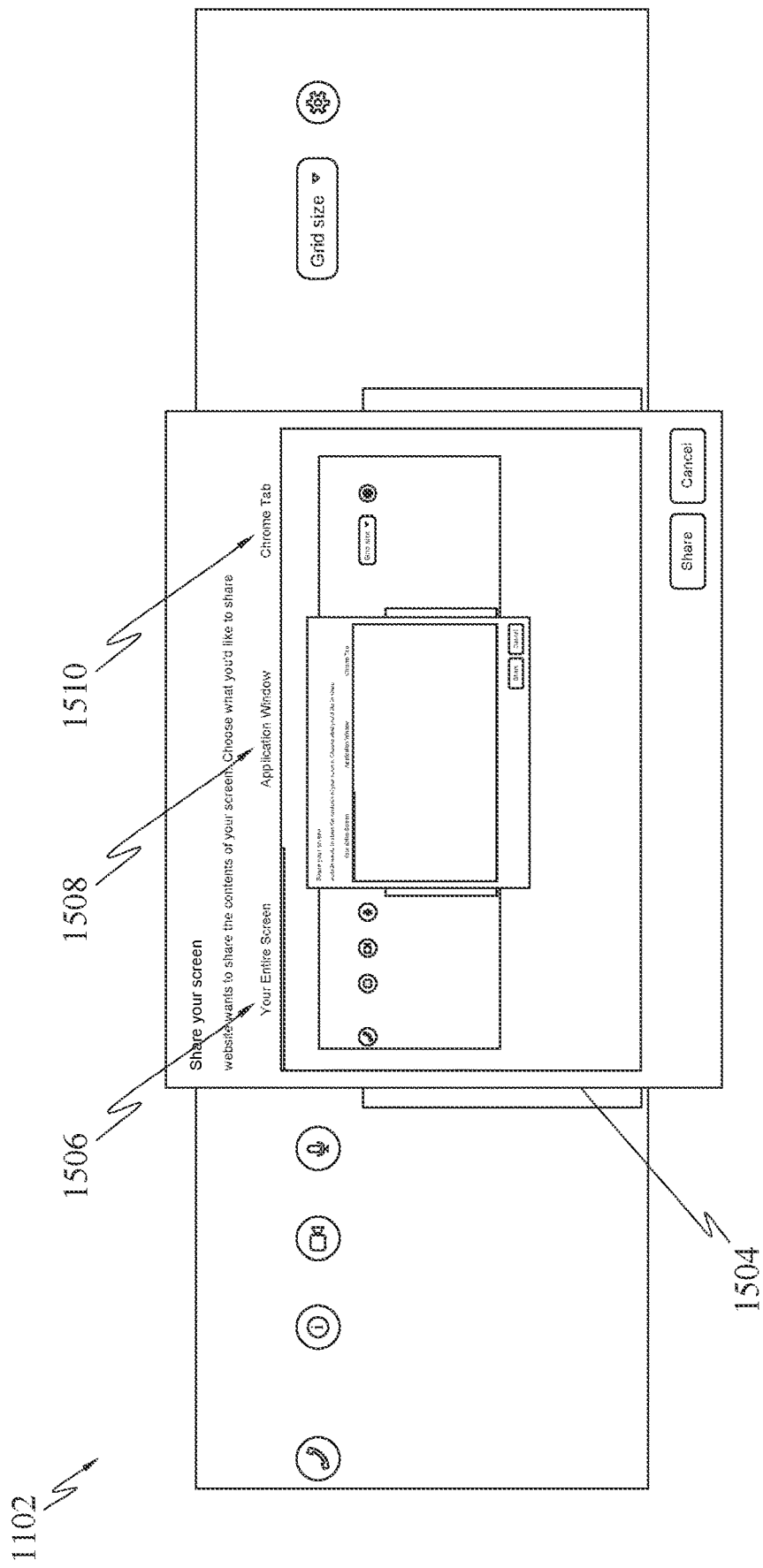
FIG. 15B illustrates the first digital client display interface 1102, in accordance with an embodiment.

Referring to FIG. 15B, upon activating the screen share icon 1502, the first digital client display interface 1102 may open a selection window 1504. The selection window 1504 may comprise a first icon 1506, a second icon 1508 and a third icon 1510. The first icon 1506 may enable the first user 810 of the first data processing system 102 to share the entire screen of the first data processing system 102.

Figure 15C:
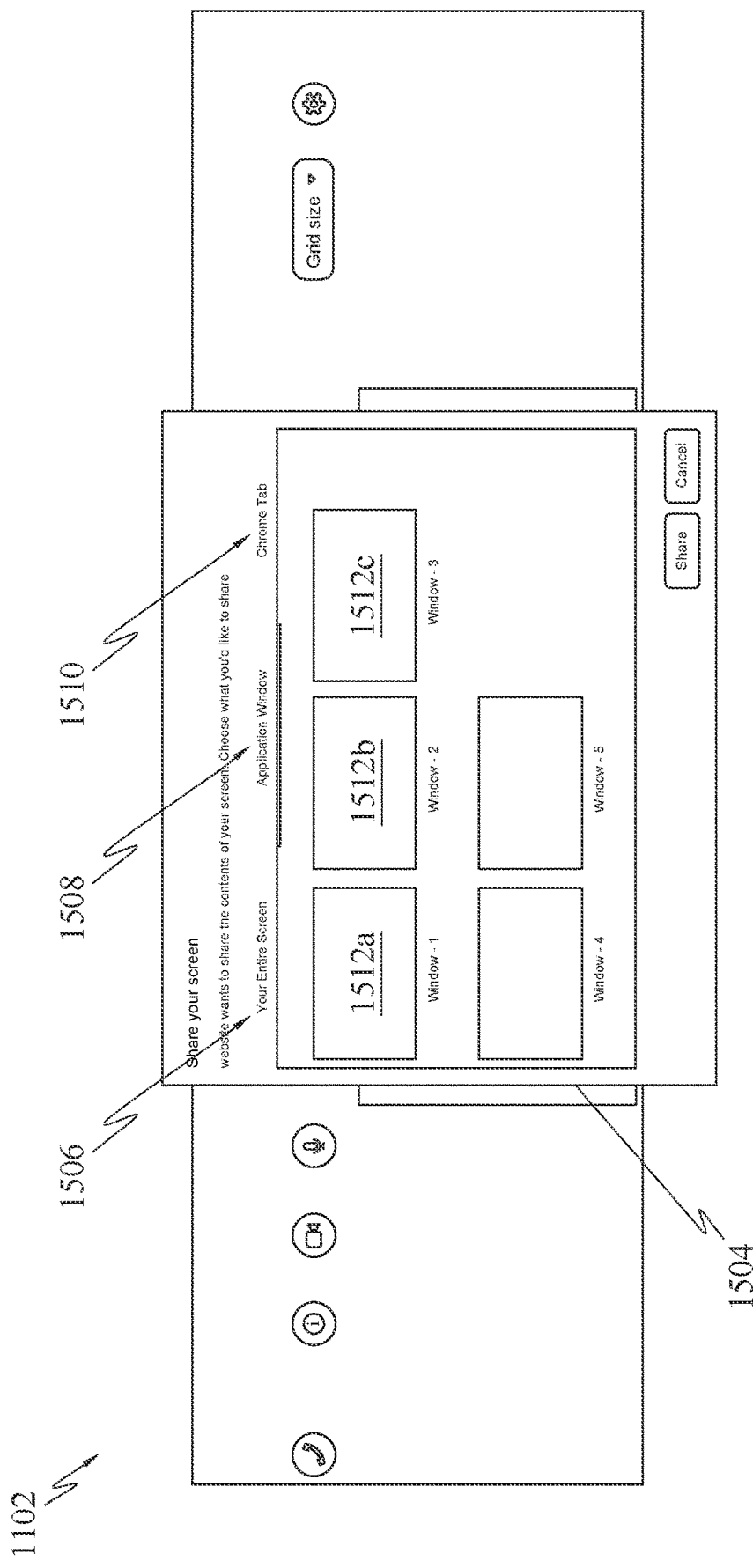
FIG. 15C illustrates the first digital client display interface 1102, in accordance with an embodiment.

Referring to FIG. 15C, the first user 810 may activate the second icon 1508 to share a particular window from a multiple application windows. As an example, the first user 810 may have multiple application windows (1512a, 1512b and 1512c) open in the first data processing system 102 and may want to share only the window of a particular application. The first user 810 may select the particular window that is to be shared from the multiple application windows (1512a, 1512b and 1512c).

Figure 15D:
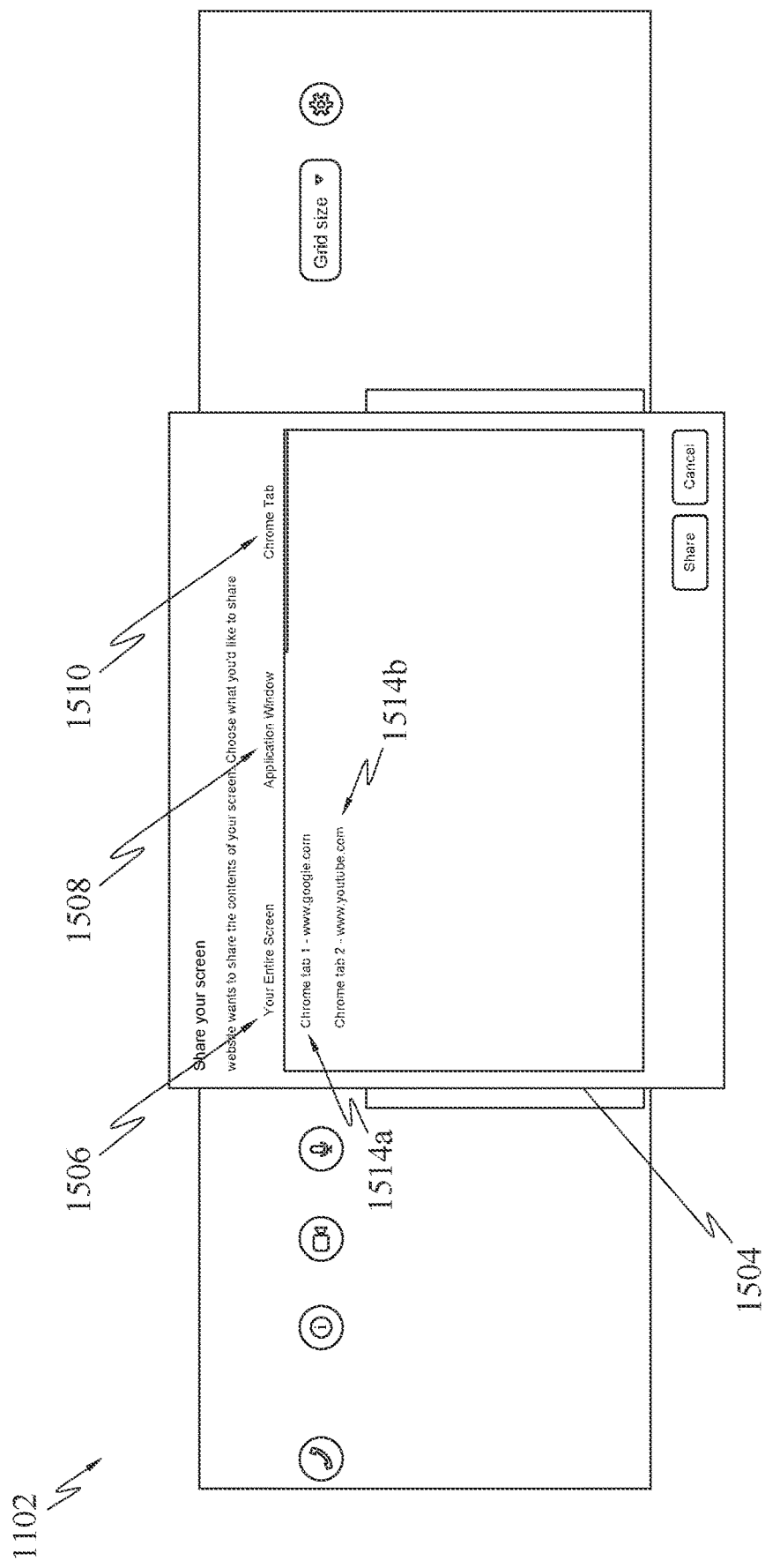
FIG. 15D illustrates the first digital client display interface 1102, in accordance with an embodiment.

Referring to FIG. 15D, the first user 810 may activate the third icon 1510 to share a particular tab from an application such as a web browser. The first user 810 may select the tab to be shared from the plurality of tabs (1514a and 1514b) that are open. The first user 810 of the first data processing system 102 may repeat the process to share another screen with the second data processing system 104 thereby sharing multiple screens with the second data processing system 104 simultaneously. Similarly, a second user 812 of the second data processing system 104 may share multiple screens with the first data processing system 102.

Therefore, it is clear that the system for enabling multiple screen sharing in an online meeting disclosed herein is completely different from the existing video conferencing tools. As an example, TEAMVIEWER enables a user to control or share desktop screens remotely. However, in TEAMVIEWER one computing system provides control or shares the screen of the entire computing system. It does not enable individually and selectively sharing screens with another computing system. As explained in FIGS. 15A-15D, the system for enabling multiple screen sharing in an online meeting, enables a user to individual share a screen of the first data processing system 102.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system enabling digital signature of a document in an online meeting, the system comprising:
a first data processing system associated with a first user, wherein the first data processing system comprises a first processor and a first digital client, the first processor causing the first digital client to individually share at least a first screen and a second screen; and
a second data processing system associated with a second user, wherein the second data processing system comprises a second processor and a second digital client, the second processor causing the second digital client to individually share at least a third screen and a fourth screen;
wherein,
the first digital client shares the first screen and the second screen while the second digital client shares the third screen and the fourth screen;
the first digital client comprises a first digital client display interface, wherein the first digital client displays in the first digital client display interface, visual content of the first screen, the second screen, the third screen and the fourth screen in individual display windows;
the second digital client comprises a second digital client display interface, wherein the second digital client displays in the second digital client display interface, visual content of the first screen, the second screen, the third screen and the fourth screen in individual display windows;
the first screen comprises a video stream and an audio stream, obtained from a first camera and a first microphone, respectively, connected to the first data processing system;
the second screen comprises a video stream displaying visual contents of a first document that is to be digitally signed by the first user and the second user;
the third screen comprises a video stream and an audio stream, obtained from a second camera and a second microphone, respectively, connected to the second data processing system; and
the fourth screen comprises a video stream displaying visual contents of the first document that is to be digitally signed by the first user and the second user;
the first data processing system is configured to receive a first unique signature from the first user and add the first unique signature to the first document, wherein the first unique signature represents the first user;
the second data processing system is configured to receive a second unique signature from the second user and add the second unique signature to the first document, wherein the second unique signature represents the second user; and
a server configured to:
coordinate communication between the first data processing system and the second data processing system;
record the visual contents of the first screen, the second screen, the third screen and the fourth screen based on an instruction received from the first user; and
store the recording of the visual contents of the first screen, the second screen, the third screen and the fourth screen.

2. The system of claim 1, wherein the first data processing system and the second data processing system is configured to access the first document simultaneously.

3. The system of claim 1, wherein the first unique signature and the second unique signature is a unique alphanumeric string respectively, wherein the first unique signature and the second unique signature is associated with the first user and the second user respectively.

4. The system of claim 1, wherein the first unique signature and the second unique signature is a unique image associated with the first user and the second user respectively.

5. The system of claim 1, wherein the server is configured to add the hyperlink of the recorded video of the online meeting stored is the server to the first document.

6. The system of claim 1, wherein the second data processing system is configured to:
receive the first document from the first data processing system, upon adding the first unique signature to the first document by the first user; and
send the first document to the third data processing system, upon adding the second unique signature to the first document by the second user.

7. The system of claim 1, wherein the server is configured to:
receive instructions from the first user to allow the second user to access the second screen shared by the first data processing system; and
add the second unique signature associated with the second user to the first document shared in the second screen.

8. The system of claim 1, wherein the first processor causes the first digital client to, based on an input received from the first user, change the size of the individual display windows, of the first digital client display interface, simultaneously to equally sized larger or smaller sized windows.

9. The system of claim 1, wherein the first processor causes the first digital client to, based on an input received from the first user, change the size of one of the individual display windows of the first digital client display interface.

10. The system of claim 1, wherein the first processor causes the first digital client to, based on an input received from the first user, move one of the individual display windows to a desired location within the first digital client display interface.

11. The system of claim 1, wherein the first processor causes the first digital client to, based on an input received from the first user, minimize at least one of the individual display windows of the first digital client display interface, while displaying the visual content in remaining of the of the individual display windows of the first digital client display interface, which are not minimized.

12. The system of claim 1, wherein,
the first processor causes the first digital client to create a first publishing data channel for each of the screens shared by the first digital client, wherein each of the first publishing data channels comprises a video track and an audio track, wherein each of the first publishing channels publishes the respective screens shared by the first digital client to a remote destination;
the first processor causes the first digital client to create a first receiving data channel for each of the screens shared by the second digital client, wherein each of the first receiving data channels comprises a video track and an audio track, wherein each of the first receiving channels receives the respective screens shared by the second digital client;

the second processor causes the second digital client to create a second publishing data channel for each of the screens shared by the second digital client, wherein each of the second publishing data channels comprises a video track and an audio track, wherein each of the second publishing channels publishes the respective screens shared by the second digital client to a remote destination; and the second processor causes the second digital client to create a second receiving data channel for each of the screens shared by the first digital client, wherein each of the second receiving data channels comprises a video track and an audio track, wherein each of the second receiving channels receives the respective screens shared by the first digital client.

13. The system of claim 12, wherein,
the first publishing channels and the first receiving channels are established between the first data processing system and the server;
the second publishing channels and the second receiving channels are established between the second data processing system and the server;
the first processor causes the first digital client to publish the screens shared by the first digital client to the server via respective first publishing channels;
the second processor causes the second digital client to publish the screens shared by the second digital client to the server via respective second publishing channels;
the first processor causes the first digital client to receive the screens shared by the second digital client from the server via respective first receiving channels; and
the second processor causes the second digital client to receive the screens shared by the first digital client from the server via respective second receiving channels.

14. The system of claim 13, wherein,
the server is configured to record an identity for each of the screens shared by the first digital client and the second digital client;
the server is configured to communicate the identity for each of the screens shared by the first digital client and the second digital client to the first digital client and the second digital client;
the first processor causes the first digital client to display the identity of the screens correlated with the respective display windows of the first digital client display interface; and
the second processor causes the second digital client to display the identity of the screens correlated with the respective display windows of the second digital client display interface.

15. The system of claim 13, wherein the identity for each of the screens shared by the first digital client and the second digital client comprises an image.

16. The system of claim 13, wherein each of the identities are unique compared to each other.

17. The system of claim 13, wherein the server is configured to create the identity for each of the screens shared by the first digital client and the second digital client.

18. The system of claim 13, wherein,
each of the identities created for the screens shared comprises a first portion and a second portion;
the first portion identifies user of the first digital client or the second digital client, whichever shared the screen; and
the second portion is unique compared to identities for screens shared by the same digital client.

* * * * *